United States Patent

Horikiri et al.

[11] Patent Number: 6,164,023
[45] Date of Patent: Dec. 26, 2000

[54] COMPRESSIVE/TENSILE-LOAD-TYPE DAMPER MADE OF LEAD AND SEISMIC ISOLATION APPARATUS USING THE SAME

[75] Inventors: Morito Horikiri, Mito; Makoto Ooka, Ibaraki; Hideo Machida, Tokyo; Syuichi Ishikura, Kobe, all of Japan

[73] Assignees: Japan Nuclear Cycle Development Institute, Ibaraki; Mitsubishi Heavy Industries, Ltd., Tokyo, both of Japan

[21] Appl. No.: 09/212,260

[22] Filed: Dec. 16, 1998

[30] Foreign Application Priority Data

Dec. 17, 1997 [JP] Japan ..................................... 9-347435

[51] Int. Cl.⁷ .................................. E04B 1/98; E04H 9/02
[52] U.S. Cl. ....................... 52/167.8; 52/167.1; 52/167.4; 248/562; 248/628; 248/636; 248/638
[58] Field of Search ................................ 52/167.1, 167.4, 52/167.7, 167.8; 188/174, 380; 248/562, 565, 566, 570, 619, 636, 628

[56] References Cited

U.S. PATENT DOCUMENTS 5,217,198  6/1993  Samarov et al. ......................... 248/638
5,353,210  10/1994  Simon et al. ............................ 248/628
5,509,238  4/1996  Scalfati .................................. 52/167.7
5,862,638  1/1999  Holland et al. ......................... 52/167.8
5,897,093  4/1999  Le Derf .................................. 248/628

FOREIGN PATENT DOCUMENTS 63-26883 9  11/1988  Japan .
5 -21484 1   8/1993  Japan .

*Primary Examiner*—Carl D. Friedman
*Assistant Examiner*—Yvonne M. Horton

[57] ABSTRACT

A compressive/tensile-load-type lead damper absorbs vibration energy by elastic-plastic deformation through bending of lead. The lead damper has a semicircular structural portion at a central portion, and compressive/tensile load input points at opposite ends of the semicircular structural portion. The center of an imaginary circle that overlaps the semicircular structural portion is located on a line connecting the load input points. The lead damper deforms by only a small amount upon receipt of compressive/tensile load and has a compact structure.

6 Claims, 6 Drawing Sheets

6,164,023

COMPRESSIVE/TENSILE-LOAD-TYPE DAMPER MADE OF LEAD AND SEISMIC ISOLATION APPARATUS USING THE SAME

BACKGROUND OF THE INVENTION

1. Field of the Invention

The present invention relates to a compressive/tensile-load-type damper made of lead (hereinafter called a "compressive/tensile-load-type lead damper"), and more particularly to a compressive/tensile-load-type lead damper that can be usefully applied to seismic isolation dampers for various kinds of equipment used in atomic power plants, thermal power plants, chemical plants, and the like.

2. Description of the Related Art

A conventional lead damper is a shearing-load-type damper that receives a shearing load upon generation of vibration and deforms accordingly to thereby absorb vibration energy. Such a lead damper has been used as a damper for damping horizontal vibrations.

FIGS. 7A–7C are front views showing examples of such a conventional lead damper. A lead damper 21 shown in FIG. 7A is formed in a quadrant shape, and its opposite ends 21a and 21b are respectively connected to structural parts 22 and 23. A lead damper 31 shown in FIG. 7B is formed in a shape of the letter L, and its opposite ends 31a and 31b are respectively connected to structural parts 32 and 33. A lead damper 41 shown in FIG. 7C has a center portion 41a formed in a quadrant shape, and its opposite ends 41b and 41c are respectively connected to structural parts 42 end 43.

All of the lead dampers 21, 31, and 41 are of a shearing-load type that deforms upon receipt of a shearing load to thereby absorb vibration energy. Each of these dampers deforms in a large amount upon receipt of a shearing load and therefore serves as an effective damper for absorbing horizontal vibrations (hereinafter referred to as a "horizontal damper").

However, when any one of the shearing-load-type lead dampers 21, 31, and 41 is used as a damper for absorbing vertical vibrations (hereinafter referred to as a "vertical damper"), it conceivably requires a large installation space. Accordingly, using the shearing-load-type lead dampers 21, 31, and 41 as a vertical damper is disadvantageous in terms of installation space and is not proper.

SUMMARY OF THE INVENTION

In view of the foregoing problem involved in conventional techniques, an object of the present invention is to provide a compressive/tensile-load-type head damper which deforms by only a small amount upon receipt of compressive/tensile load and which has a compact structure.

To achieve the above object, the present invention provides a compressive/tensile-load-type lead damper including a semicircular structural portion formed at a central portion of the lead damper and compressive/tensile load input points provided at opposite ends of the semicircular structural portion of the lead damper. The center of the semicircular structural portion is located on an imaginary line connecting the load input points.

In the compressive/tensile-load-type lead damper of the present invention, upon receipt of a compressive/tensile load, the semicircular structural portion bends and causes an elastic-plastic deformation to thereby absorb vibration energy. Further, since the inclination of hysteresis (see FIG. 3, a detailed description will be given below) is large, the lead damper serves as a highly rigid damper that deforms by only a small amount upon receipt of a compressive/tensile load and has a desired hysteresis characteristic.

The present invention also provides a seismic isolation apparatus including a lower-side structure, an upper-side structure, and at least one compressive/tensile-load-type lead damper. The damper includes a semicircular structural portion formed at a central portion of the lead damper and a pair of compressive/tensile load input points provided at opposite ends of the semicircular structural portion, one of the input points being connected to the lower-side structure and the other of the input points being connected to the upper-side structure. The center of the semicircular structural portion is located on an imaginary line connecting the load input points.

The seismic isolation apparatus may be a vertical damper.

The seismic isolation apparatus may include a plurality of compressive/tensile-load-type lead dampers.

The present invention further provides a seismic isolation apparatus including an upper-side deck adopted to support at least one container, a lower-side structure having at least one concave portion adopted to accommodate the at least one container, a plurality of disk springs provided between the upper-side deck and the lower-side deck, and a plurality of compressive/tensile-load-type lead dampers. Each of the dampers includes a semicircular structural portion formed at a central portion of the lead damper and a pair of compressive/tensile load input points provided at opposite ends of the semicircular structural portion, one of the input points being connected to the lower side first structure and the other of the input points being connected to the upper side second structure. The center of an arc of the semicircular structural portion is located on an imaginary line connecting the load input points, and the lead dampers and the disk springs surrounds the container.

The present invention further provides a method of damping a compressive/tensile load. The method comprises the steps of forming a semicircular structural portion at a central portion of the lead damper; and providing compressive/tensile load input points at opposite ends of the semicircular structural portion of the lead damper, such that the center of the semicircular structural portion is located on an imaginary line connecting the load input points.

BRIEF DESCRIPTION OF THE DRAWING

The present invention will become more fully understood from the detailed description given hereinbelow and the accompanying drawings which are given by way of illustration only, and thus are not limitative of the present invention; and wherein.

DESCRIPTION OF THE PREFERRED EMBODIMENT

An embodiment of the present invention will next be described in detail with reference to the drawings.

Figure 1:
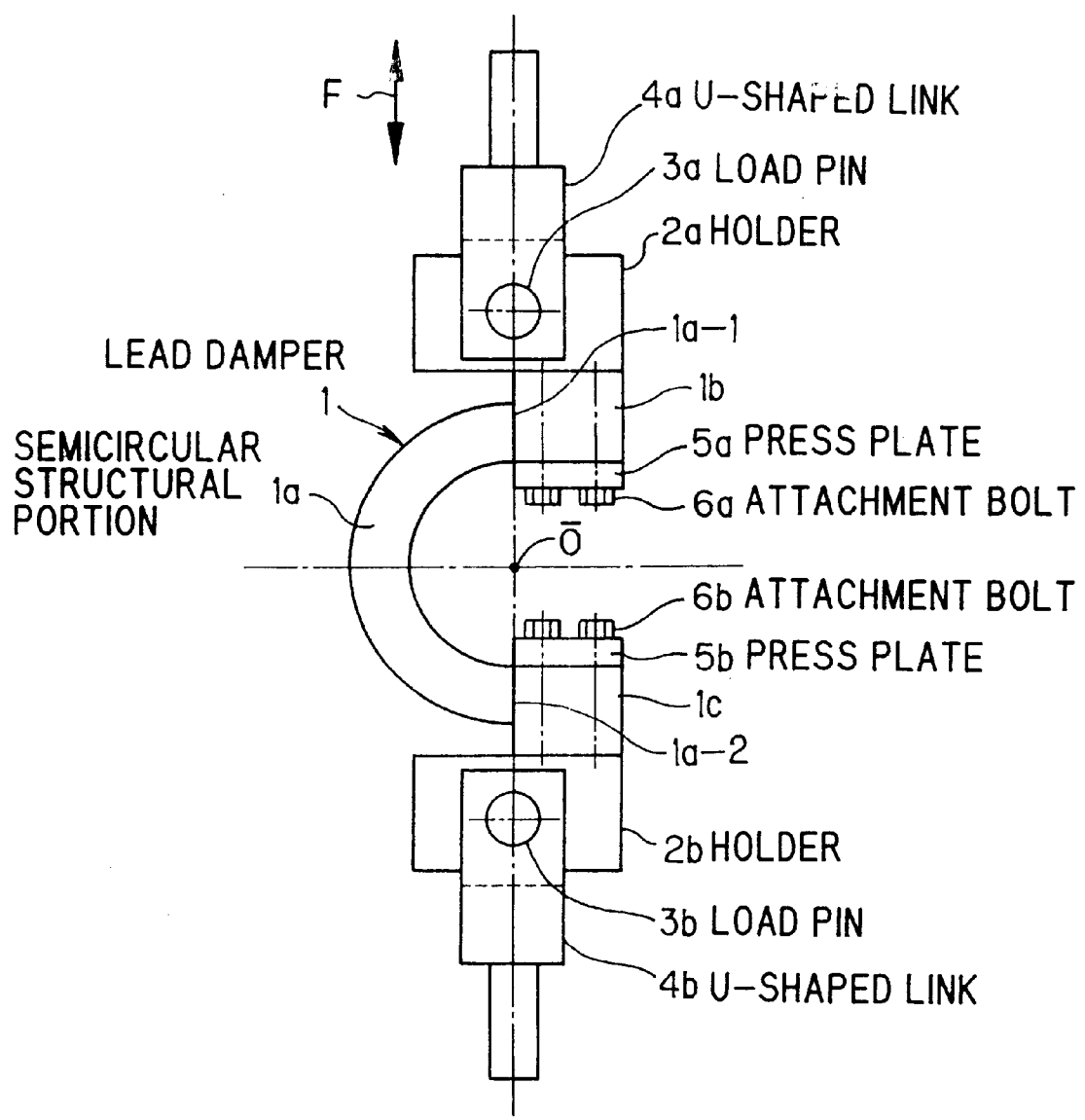
FIG. 1 is a front view of a lead damper according to an embodiment of the present invention.
Figure 2:
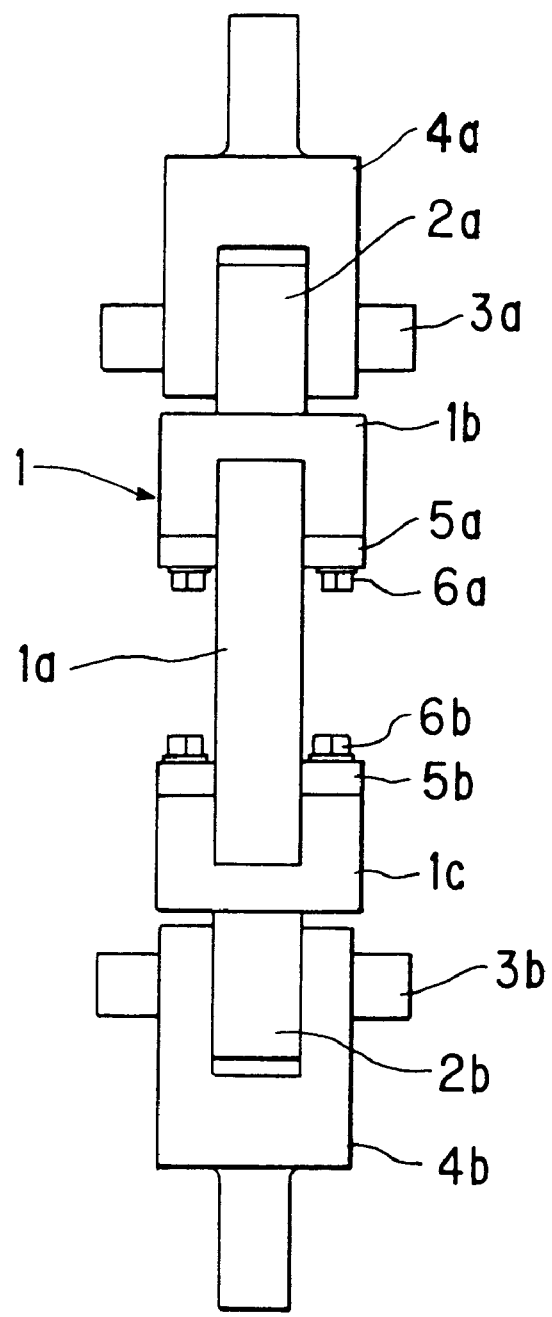
FIG. 2 is a side view of the lead damper according to the embodiment of the present invention.

As shown in FIGS. 1 and 2, a lead damper 1 has a semicircular structural portion 1a at a central portion. Upon receipt of a compressive/tensile load F in the vertical direction in FIG. 1, the semicircular structural portion 1a bends and causes an elastic-plastic deformation to thereby absorb vibration energy. Thus, the lead damper 1 serves as a compressive/tensile-load-type lead damper. The lead damper 1 has holding portions 1b and 1c formed at upper and lower ends of the semicircular structural portion 1a. The holding portions 1b and 1c are respectively fixed to upper and lower holders 2a and 2b through use of press plates 5a and 5b, and attachment bolts 6a and 6b. The holders 2a and 2b are respectively connected to upper and lower U-shaped links 4a and 4b via upper and lower load pins 3a and 3b.

Therefore, the upper and lower load pins 3a and 3b serve as input points through which a compressive/tensile load F acts on the lead damper 1. That is, the compressive/tensile load F acts on the upper and lower ends 1a-1 and 1a-2 of the semicircular structural portion 1a via the load pins 3a and 3b. Further, the center of a imaginary circle overlapping the semicircular structural portion 1a (hereinafter, referred to as the "center O of the semicircular structural portion") is located on a line connecting the center of the load pins 3a and 3b (i.e., load input points).

The formation of the semicircular structural portion 1a at the center portion of the lead damper 1 enables absorption of vibration energy by the entire curved portion (semicircular structural portion 1a). Instead of being formed in a semi-circular shape, the center portion of the lead damper 1 may be formed in a circular shape, an elliptical shape, a semi-elliptical shape, a U shape, a triangular shape, or the like. However, if the center portion of the lead damper 1 is formed in an eLliptical shape, a triangular shape, or the like, load concentrates at the center portion thereof.

Figure 4:
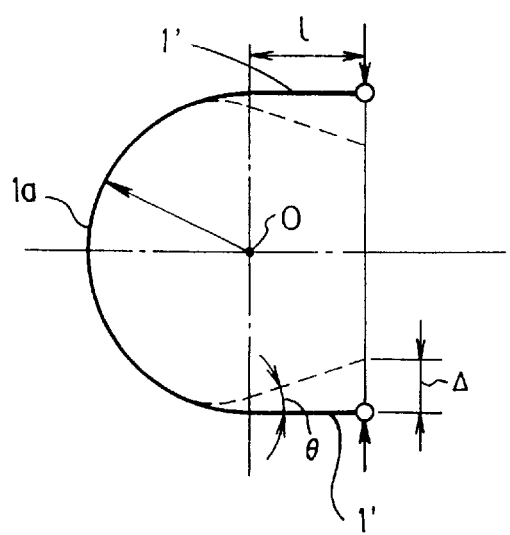
FIG. 4 is an explanatory view in relation to the structure of the lead damper.

Further, the reason why the center O of the semicircular structural portion 1a is located on a line connecting the load input points (the center of the load pins 3a and 3b) is as follows. As shown in FIG. 4, if straight portions 1', each having a length "l," were present at the opposite ends of the semicircular structural portion 1a and a compressive load acted on the free ends of the straight portions 1, a displacement corresponding to l·θ would be added to an amount Δ of compression exerted by the compressive load, so that the stiffness would decrease.

From the above-described consideration and from the viewpoint of mechanics of materials and results of an experiment in which a straight lead bar was used as a lead damper, the inventors of the present invention reached the following conclusion. That is, in order to increase the stiffness and efficiency in absorbing vibration energy, as in the above-described lead damper 1, a lead damper must be constructed such that the lead damper has a semicircular structural portion 1a at a center portion thereof; input points (load pins 3a and 3b) for receiving compressive/tensile load are provided on opposite ends of the semicircular structural portion 1a and the center O of the semicircular structural portion 1a is located on a line connecting the load input points.

The compressive/tensile-load-type lead damper 1 having the above-described structure operates as follows.

As shown in FIG. 1, when a vertical vibration is generated and a consequent vertical compressive/tensile load F acts on the upper and lower ends 1a-1 and 1a-2 of the semicircular structural portion 1a via the load pins 3a and 3b, an elastic-plastic strain is generated across the cross section of the semicircular structural portion 1a. Since compressive and tensile loads alternately acts on the semicircular structural portion 1a, the semicircular structural portion 1a exhibits a hysteresis as shown in FIG. 3.

Figure 3:
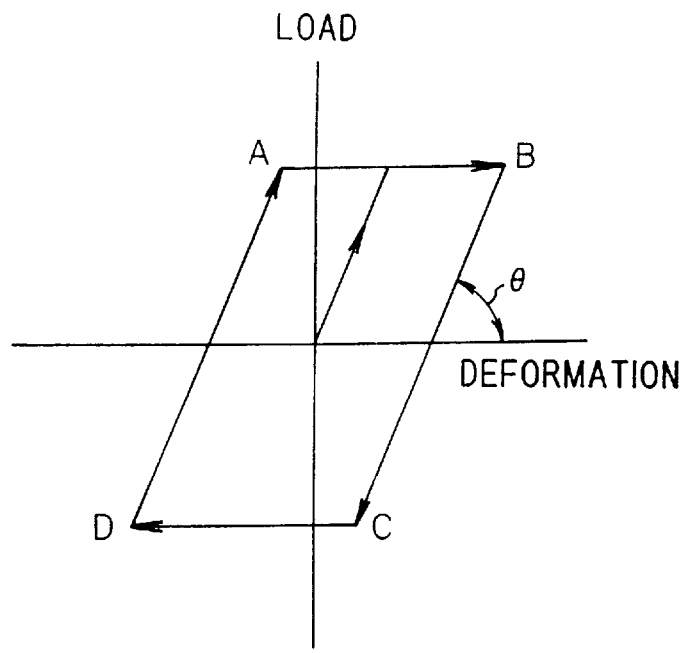
FIG. 3 is an explanatory diagram showing the hysteresis characteristic of the lead damper.

The area surrounded by the hysteresis curve of FIG. 3 passing through points A, B, C, and D represents an absorption energy. The effect of damping vibrations increases as the area increases. Also, as the inclination θ of the hysteresis curve increases, the amount of deformation due to the compressive/tensile load F decreases, so that the lead damper 1 serves as a highly rigid damper having a large spring constant and a desirable hysteresis.

As described above, in the lead damper 1 of the present embodiment, the semicircular structural portion 1a is formed at a center portion thereof; the load pins 3a and 3b serving as load input points for receiving compressive/tensile load F are provided on opposite ends of the semicircular structural portion 1a; and the center O of the semicircular structural portion 1a is located on a line connecting the load pins 3a and 3b (load input points). Therefore, the inclination θ of the hysteresis curve is large, so that the lead damper serves as a highly rigid damper that deforms by only a small amount upon receipt of a compressive/tensile load F and has a desired hysteresis characteristic. Further, the lead damper 1 can be made compact. Therefore, the lead damper 1 can be effectively used as a vertical damper.

Figure 5A:
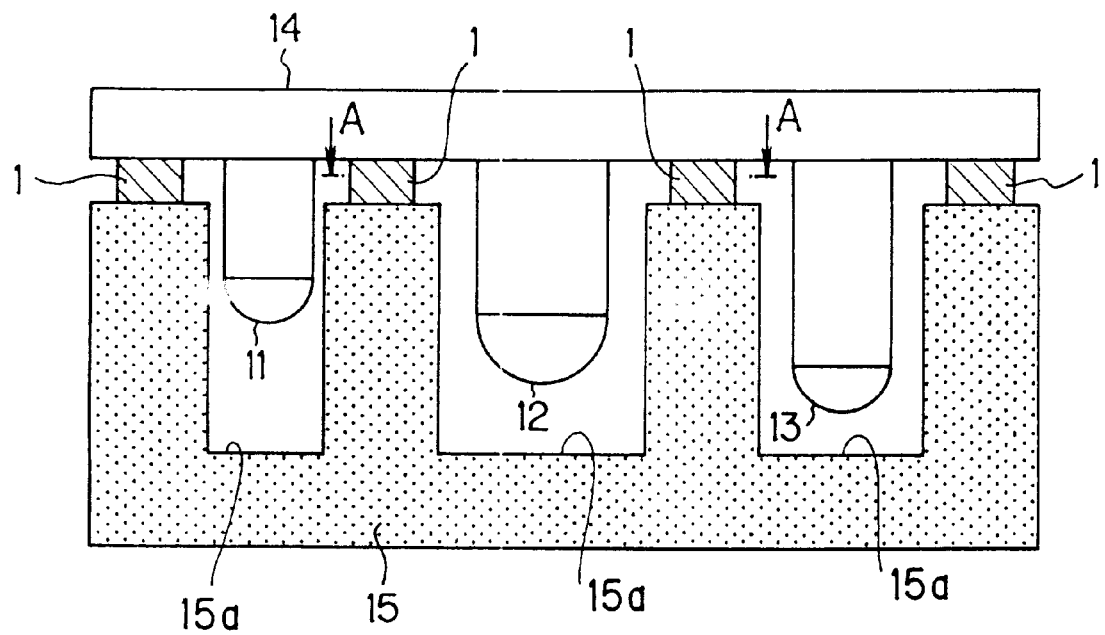
FIG. 5A a sectional view of a vertical seismic isolation apparatus in which the lead damper is combined with disk springs.

Next, a description will be given of a vertical seismic isolation apparatus in which the lead damper is combined with disk springs. FIG. 5A shows a sectional view of the vertical seismic isolation apparatus, and FIG. 5B shows a sectional view taken along line A–A in FIG. 5A.

Figure 5B:
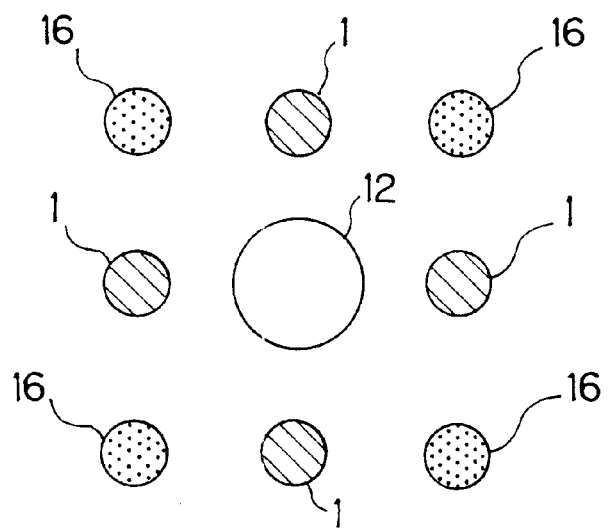
FIG. 5B is a sectional view taken along line A—A in FIG. 5A.

As shown in FIGS. 5A and 5B, containers 11, 12, and 13 are supported by a common deck 14. A plurality of lead dampers 1 and a plurality of disk springs 16 are disposed between the common deck 14 located above a concrete structure 15. The concrete structure 15 has concave portions 15a for accommodating the containers 11, 12, and 13. The lead dampers 1 and the disk springs 16 are disposed such that they surround the containers 11, 12, and 13. Thus, a vertical seismic isolation apparatus is constructed. The upper holding portion 1b of each lead damper 1 is connected to the common deck 14 via the upper U-shaped link 4a (see FIG. 1), while the lower holding portion 1c of each lead damper 1 is connected to the concrete structure 15 via the lower U-shaped link 4b (see FIG. 1).

In the seismic isolation apparatus, the lead dampers 1 cooperate with the disk springs 16 to damp earthquake-induced oscillation in the vertical direction.

Figure 6:
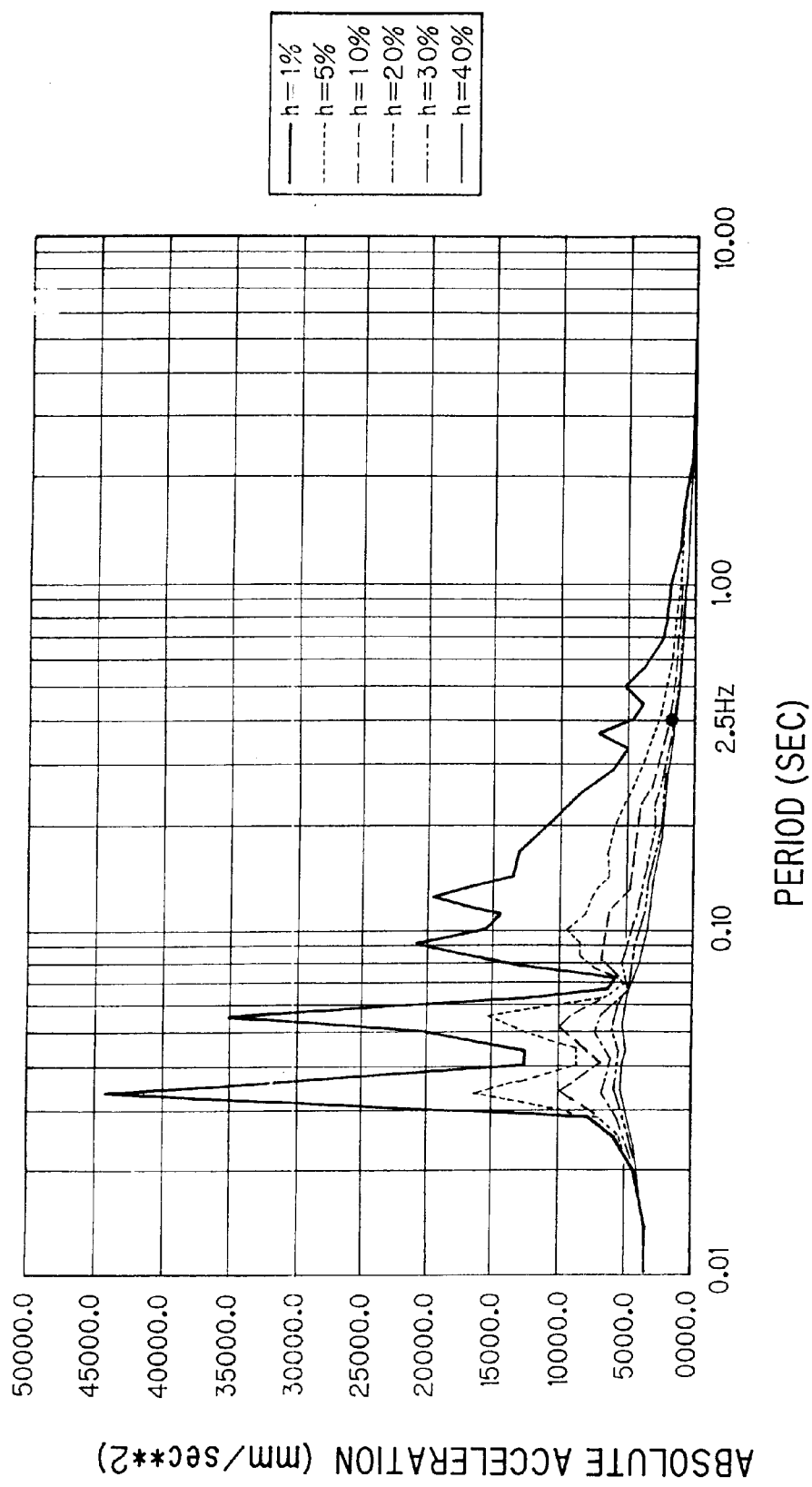
FIG. 6 is a graph showing a response spectrum of the seismic isolation apparatus to earthquake in the vertical direction.
Figure 7A:
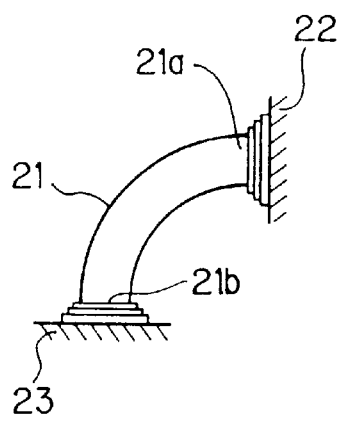
FIG. 7A–7C show respective front views of conventional lead dampers.
Figure 7B:
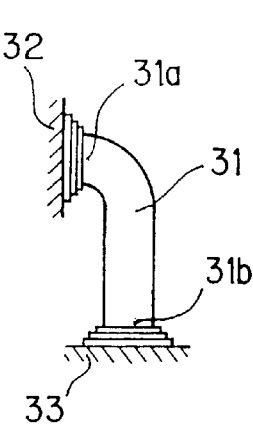
Figure 7C:
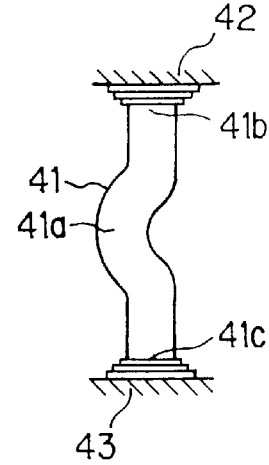

FIG. 6 shows an acceleration response spectrum in the case of an earthquake. This acceleration response spectrum clearly shows the effect of the lead damper 1 (damping factor h=about 20–40%). That is, the lead damper 1 can be effectively used as a damper of a vertical seismic isolation apparatus.

The above does not mean that all lead dampers 1 of the present invention must have a damping factor h of about 20–40% but that a damping factor h of about 20–4:0% was obtained from the results of an experiment performed for a specific lead damper 1 in which the radius, cross-sectional dimension, and the like of the semicircular structure portion 1a were set to certain values (or obtained from a theoretical calculation).

As specifically described with reference to the embodiment of the present invention, in the compressive/tensile-load-type lead damper of the present invention, a semicircular structural portion is formed at a center portion thereof; input points for receiving compressive/tensile load are provided on opposite ends of the semicircular structural portion; and the center of the semicircular structural portion is located on a line connecting the load input points. Therefore, the inclination of the hysteresis curve is large, so that the lead damper serves as a highly rigid damper that deforms by only a small amount upon receipt of a compressive/tensile load and has a desired hysteresis characteristic. Further, the lead damper can be made compact. Therefore, the compressive/tensile-load-type lead damper of the present invention can be effectively used as a vertical damper in a vertical seismic isolation apparatus and the like. As is described in the embodiment, when the compressive/tensile-load-type lead damper is used in a vertical seismic isolation apparatus, a damping effect of, for example, about 20–40% (a damping coefficient with respect to response acceleration converted into a viscous damping coefficient) can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compressive/tensile-load-type lead damper, comprising:
    a semicircular structural portion formed at a central portion of the lead damper; and
    compressive/tensile load input points provided at opposite ends of the semicircular structural portion of said lead damper,
    wherein the center of an imaginary circle overlapping the semicircular structural portion is located on an imaginary line connecting said load input points.

2. A seismic isolation apparatus, comprising:
    a lower-side structure;
    an upper-side structure; and
    at least one compressive/tensile-load-type lead damper, said damper including,
        a semicircular structural portion formed at a central portion of the lead damper, and
        a pair of compressive/tensile load input points provided at opposite ends of the semicircular structural portion, one of said input points being connected to said lower-side structure and the other of said input points being connected to said upper-side structure,
    wherein the center of an imaginary circle overlapping the semicircular structural portion is located on an imaginary line connecting said load input points.

3. The seismic isolation apparatus according to claim 2, wherein said apparatus is a vertical damper.

4. The seismic isolation apparatus according to claim 2, wherein said apparatus includes a plurality of compressive/tensile-load-type lead dampers.

5. A seismic isolation apparatus, comprising:
    at least one container;
    an upper-side deck adapted to support at least one container;
    a lower-side structure having at least one concave portion adapted to accommodate the at least one container;
    a plurality of disk springs adapted to surround the at least one container and provided between said upper-side deck and said lower-side structure; and
    a plurality of compressive/tensile-load-type lead dampers adapted to surround the at least one container, said dampers including,
        a semicircular structural portion formed at a central portion of the lead damper, and
        a pair of compressive/tensile load input points provided at opposite ends of the semicircular structural portion, one of said input points being connected to said lower-side structure and the other of said input points being connected to said upper-side deck,
    wherein the center of an imaginary circle overlapping the semicircular structural portion is located on an imaginary line connecting said load input points.

6. A method of damping a compressive/tensile load, comprising:
    forming a semicircular structural portion at a central portion of the lead damper; and
    providing compressive/tensile load input points at opposite ends of the semicircular structural portion of the lead damper, such that the center of an imaginary circle overlapping the semicircular structural portion is located on an imaginary line connecting the load input points.

* * * * *